US012734835B2

(12) United States Patent
Takahashi et al.

(10) Patent No.: US 12,734,835 B2
(45) Date of Patent: Sep. 15, 2026

(54) PRINTER

(71) Applicants: CITIZEN WATCH CO., LTD., Tokyo (JP); CITIZEN SYSTEMS JAPAN CO., LTD., Tokyo (JP)

(72) Inventors: Akira Takahashi, Nagano (JP); Yutaka Inokuchi, Nagano (JP)

(73) Assignees: CITIZEN WATCH CO., LTD., Tokyo (JP); CITIZEN SYSTEMS JAPAN CO., LTD., Tokyo (JP)

( * ) Notice: Subject to any disclaimer, the term of this patent is extended or adjusted under 35 U.S.C. 154(b) by 75 days.

(21) Appl. No.: 18/716,128

(22) PCT Filed: Nov. 25, 2022

(86) PCT No.: PCT/JP2022/043569
§ 371 (c)(1),
(2) Date: Jun. 3, 2024

(87) PCT Pub. No.: WO2023/112641
PCT Pub. Date: Jun. 22, 2023

(65) Prior Publication Data

US 2025/0042186 A1 Feb. 6, 2025

(30) Foreign Application Priority Data

Dec. 14, 2021 (JP) ................................ 2021-202751

(51) Int. Cl.
*B41J 13/00* (2006.01)
*B41J 3/60* (2006.01)
(Continued)

(52) U.S. Cl.
CPC ............... *B41J 13/009* (2013.01); *B41J 3/60* (2013.01); *B41J 11/70* (2013.01); *B41J 29/023* (2013.01)

(58) Field of Classification Search
CPC ... B41J 13/009; B41J 3/60; B41J 11/70; B41J 29/023; B41J 2/32; B41J 11/48; B41J 15/042; B65H 29/00
See application file for complete search history.

(56) References Cited

U.S. PATENT DOCUMENTS

2006/0087546 A1 4/2006 Tsuji
2015/0298472 A1* 10/2015 Kamitani ................ B41J 11/48 347/220

(Continued)

FOREIGN PATENT DOCUMENTS

CN 212765324 U 3/2021
JP 2004035129 A 2/2004

(Continued)

OTHER PUBLICATIONS

English machine translation of Yoshinori (JP 2013018201 A) (Year: 2013).*

(Continued)

*Primary Examiner* — Ricardo I Magallanes
*Assistant Examiner* — Natasha Dephenia Quinn
(74) *Attorney, Agent, or Firm* — Tucker Ellis LLP

(57) ABSTRACT

A printer includes a roll paper housing that houses roll paper, a sheet paper housing that houses sheet paper, a print portion that prints on the roll paper and the sheet paper, and a flip portion that flips a side of the sheet paper to be printed on by the print portion, wherein the flip portion includes at least a portion and at least another portion, the portion being provided in front of the roll paper housing and overlapping with the roll paper housing when viewed in a front and back direction, and the another portion being provided below the roll paper housing and overlapping with the roll paper housing when viewed in a height direction.

10 Claims, 11 Drawing Sheets

(51) Int. Cl.
*B41J 11/70* (2006.01)
*B41J 29/02* (2006.01)

(56) References Cited

U.S. PATENT DOCUMENTS

| | | | | |
|---|---|---|---|---|
| 2021/0260898 | A1* | 8/2021 | Takei | B26D 1/185 |
| 2021/0354486 | A1 | 11/2021 | Tahara | |
| 2025/0269670 | A1* | 8/2025 | Takahashi | B41J 13/009 |

FOREIGN PATENT DOCUMENTS

| | | | | | |
|---|---|---|---|---|---|
| JP | 2004279603 | A | | 10/2004 | |
| JP | 2005258251 | A | | 9/2005 | |
| JP | 2013018201 | A | * | 1/2013 | B41J 11/70 |
| JP | 2013120306 | A | | 6/2013 | |

OTHER PUBLICATIONS

International Search Report from corresponding International Application No. PCT/JP2022/043569, Jan. 31, 2023, 4 pages with translation.
Extended European Search Report from corresponding Application No. 22907172.5 mailed on Nov. 14, 2025, 12 pages.
Chinese Office Action dated May 22, 2026 for Application Serial No. 202280080882.X (7 pages).

* cited by examiner

PRINTER

CROSS-REFERENCE TO RELATED APPLICATIONS

This application is a National Phase Entry of International Application No. PCT/JP2022/043569, filed Nov. 25, 2022, and claims priority to Japanese Patent Application 2021-202751, filed Dec. 14, 2021, the disclosures of which are incorporated by reference herein in their entireties.

TECHNICAL FIELD

The present disclosure relates to a printer.

BACKGROUND ART

Some printers use not only sheet paper cut into a predetermined length but also roll paper that is a long sheet of paper rolled into a roll, and include a sheet paper housing in which sheet paper is housed and a roll paper housing. There are also printers that print on both the front and back sides of the paper. When printing on the both sides of the paper, the printer must be equipped with a flip portion that flips the front and back sides of the paper.

Here, in a printer including a sheet paper housing and a roll paper housing, there is a printer that removes roll paper from the roll paper housing and uses the space of the roll paper housing as a flip portion (see, for example, JP 2014-129172). There are also printers provided with a sheet paper housing, a roll paper housing, and a flips portion (see, for example, JP 2021-054607A).

SUMMARY

However, the printer disclosed in JP 2014-129172A has a problem that its height dimension is large because it is separated into two bodies of a casing including a roll paper housing and a casing including a flip portion. In addition, the printer disclosed in JP 2021-054607A requires the roll paper to be removed from the roll paper housing when printing on both sides of sheet paper.

The present disclosure has been made in view of the above circumstances, and it is an object to provide a printer including a roll paper housing and a flip portion with a small dimension in the height direction.

The present disclosure relates to a printer including a roll paper housing that houses roll paper, a sheet paper housing that houses sheet paper, a print portion that prints on the roll paper and the sheet paper, and a flip portion that flips a side of the sheet paper to be printed on by the print portion, wherein the flip portion includes at least a portion and at least another portion, the portion being provided in front of the roll paper housing and overlapping with the roll paper housing when viewed in a front and back direction, and the another portion being provided below the roll paper housing and overlapping with the roll paper housing when viewed in a height direction.

BRIEF DESCRIPTION OF DRAWINGS

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

DESCRIPTION OF EMBODIMENTS

An embodiment of a printer according to the present disclosure is described below with reference to drawings.

Figure 1:
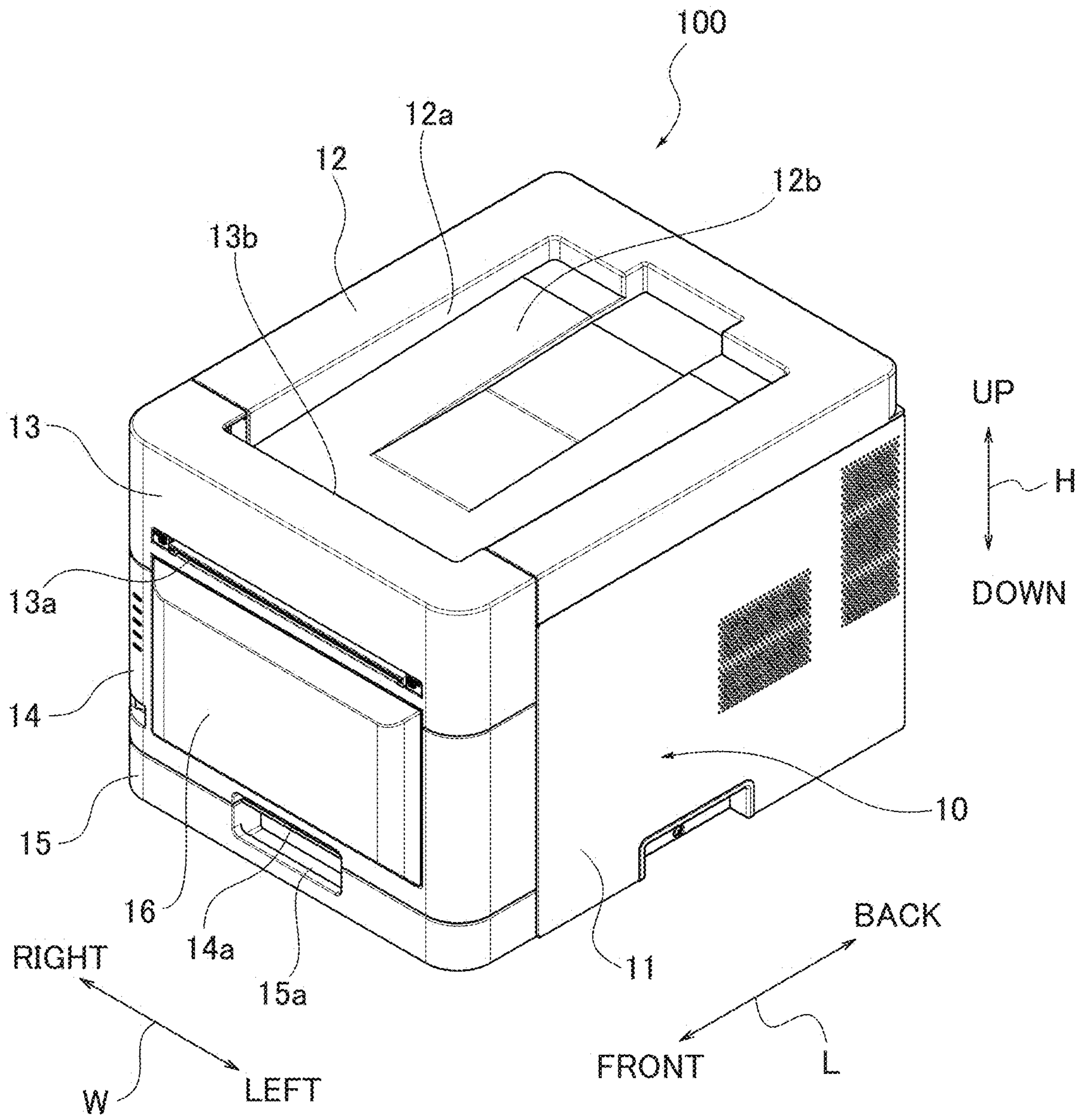
FIG. 1 is a perspective view illustrating an external of a sublimation thermal printer (hereinafter referred to as printer).
Figure 2:
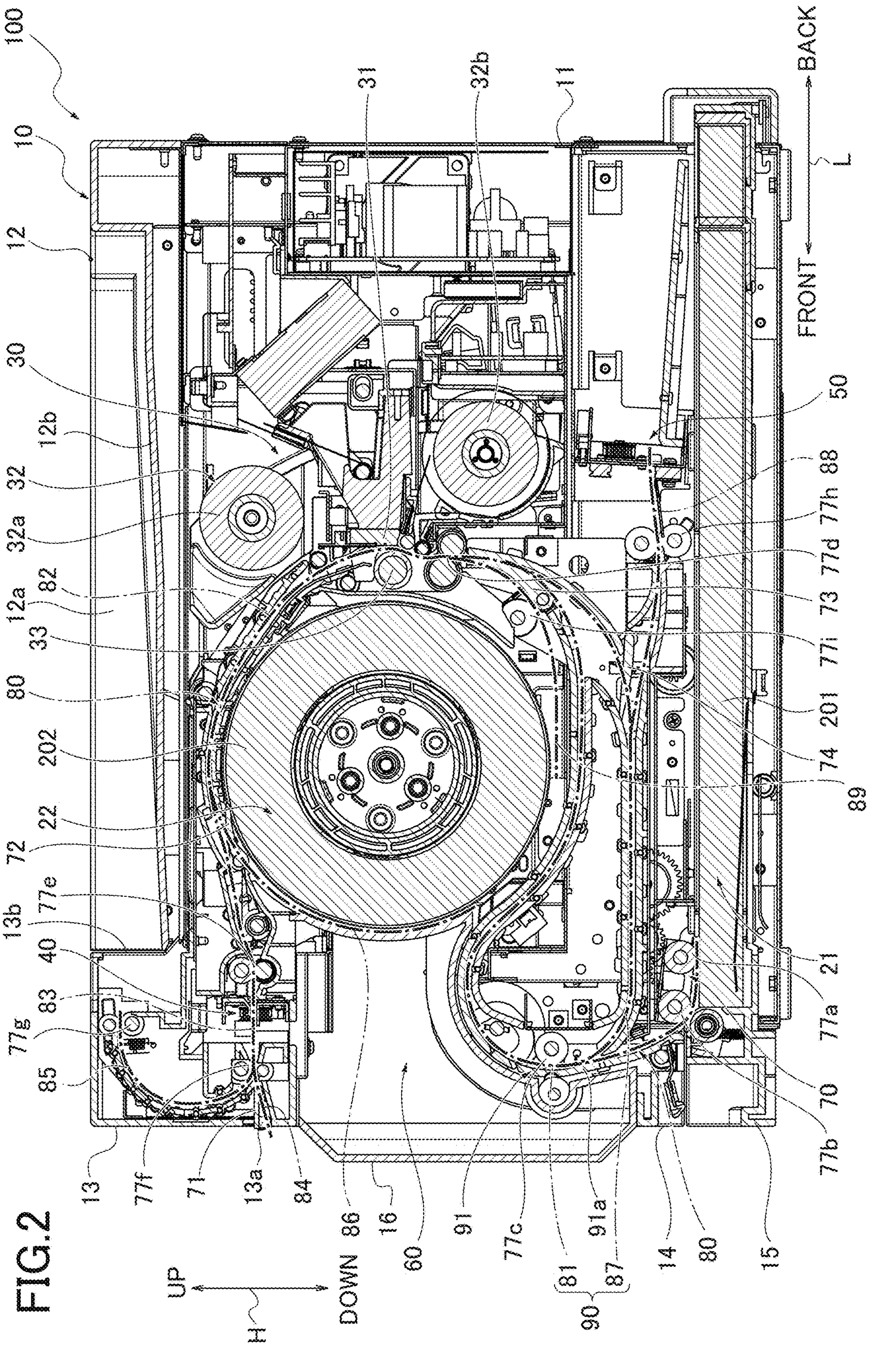
FIG. 2 is a sectional view of the printer in a vertical plane along a front and back direction L through a center of a width direction W of the printer.
Figure 3:
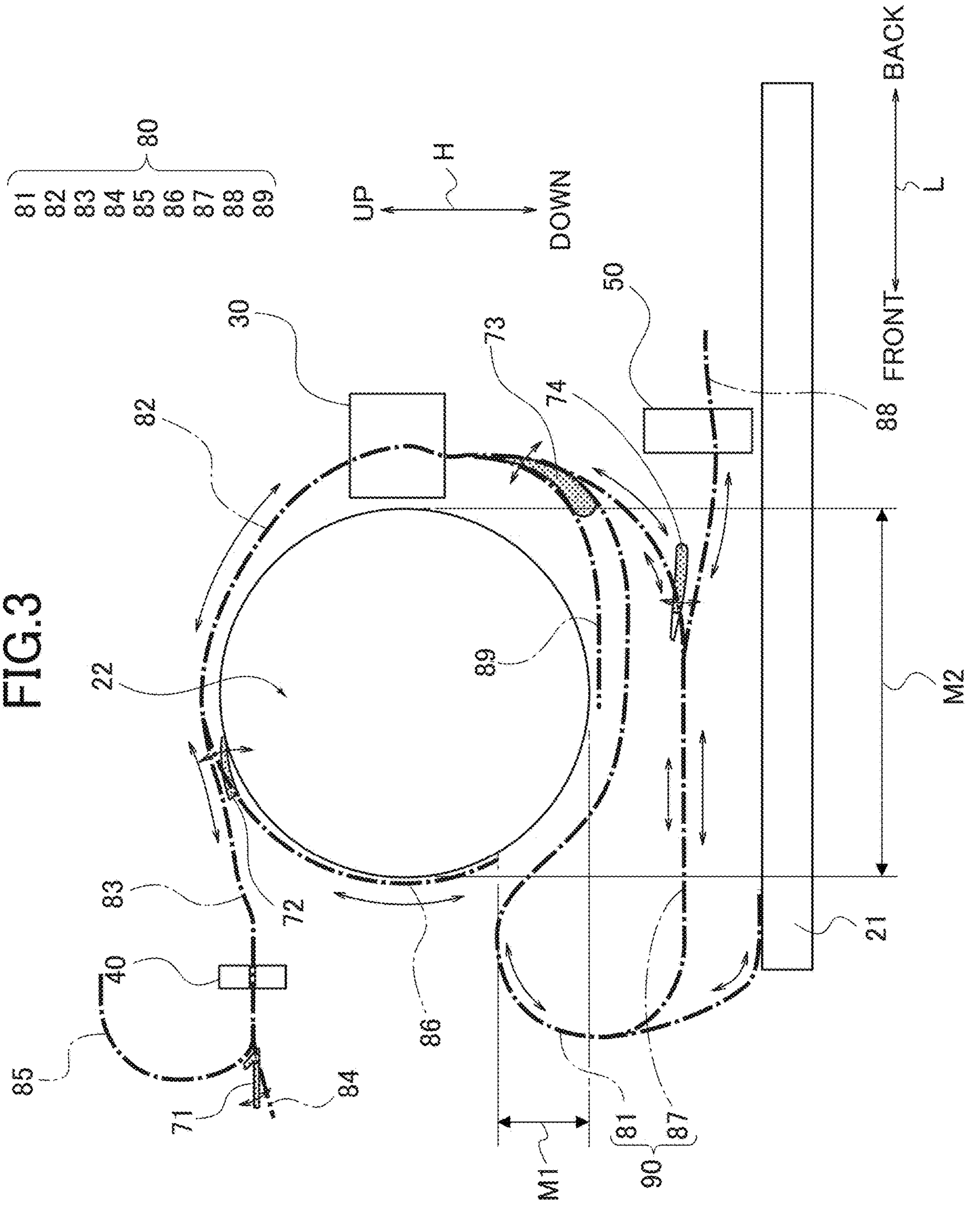
FIG. 3 is a schematic view for clarity of a carrying path illustrated in FIG. 2.
Figure 4:
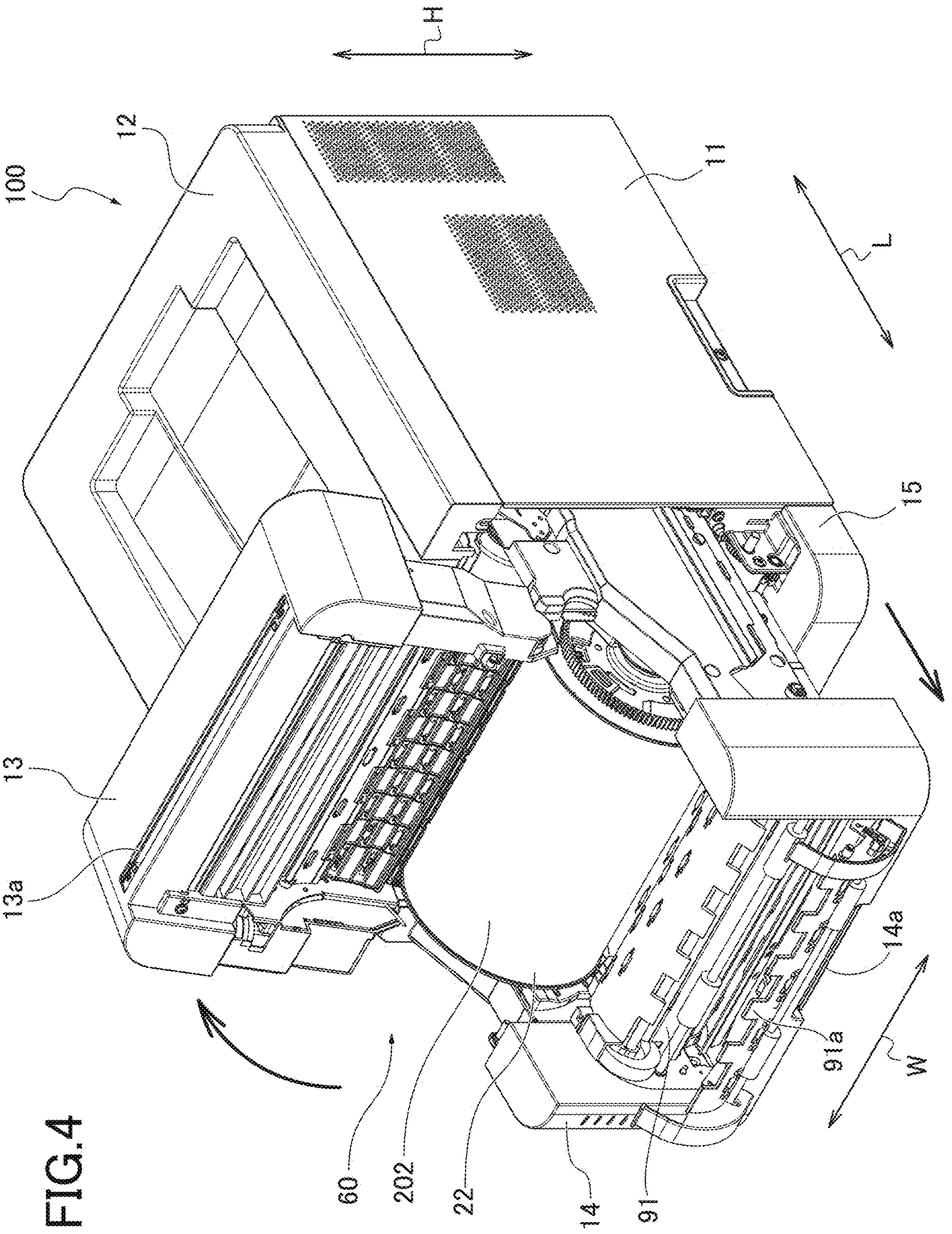
FIG. 4 is a perspective view illustrating the printer with a front upper cover open and a roll paper housing drawn forward in the front and back direction L.
Figure 5:
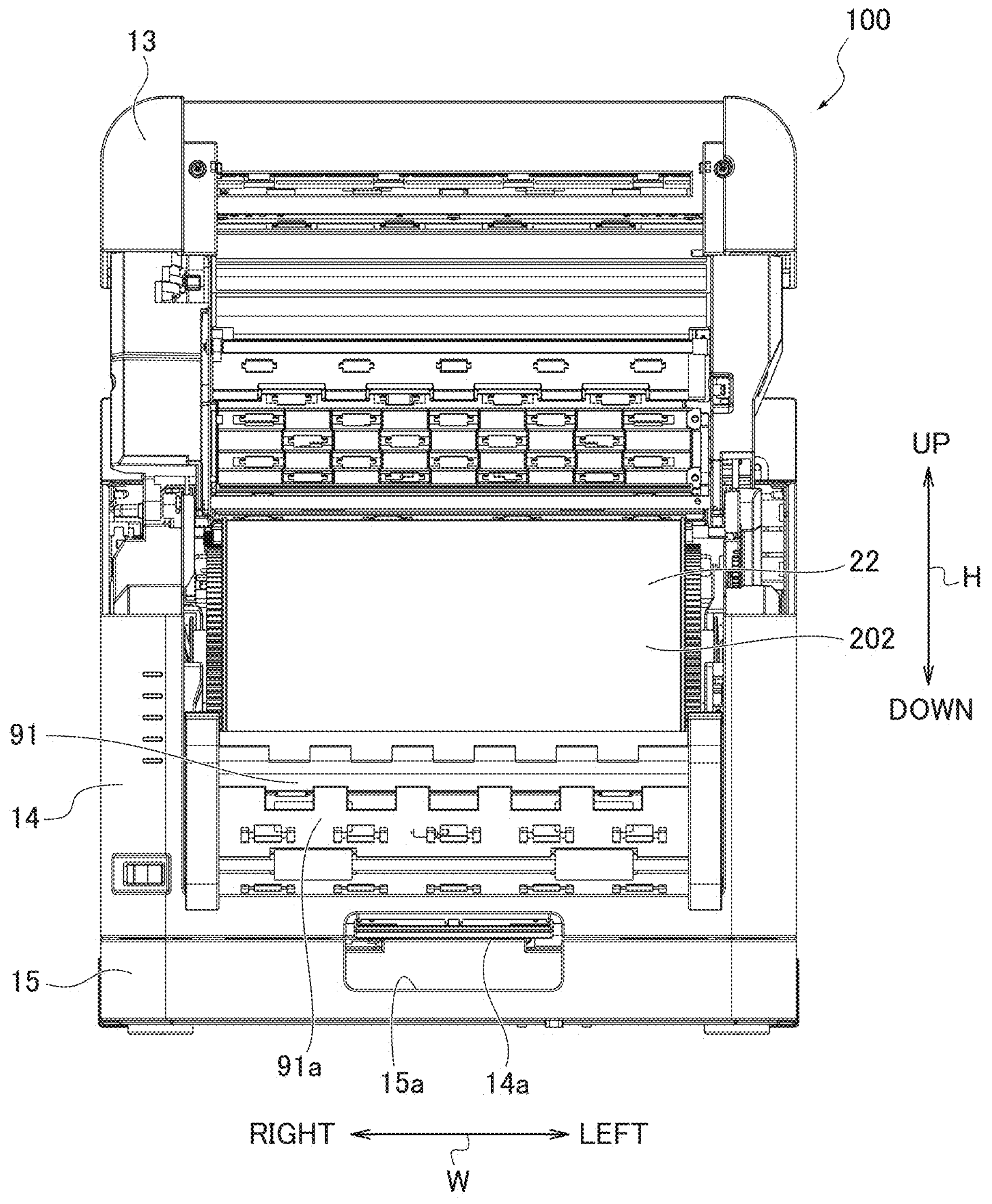
FIG. 5 is a front view from the front of the printer illustrated in FIG. 4.
Figure 6:
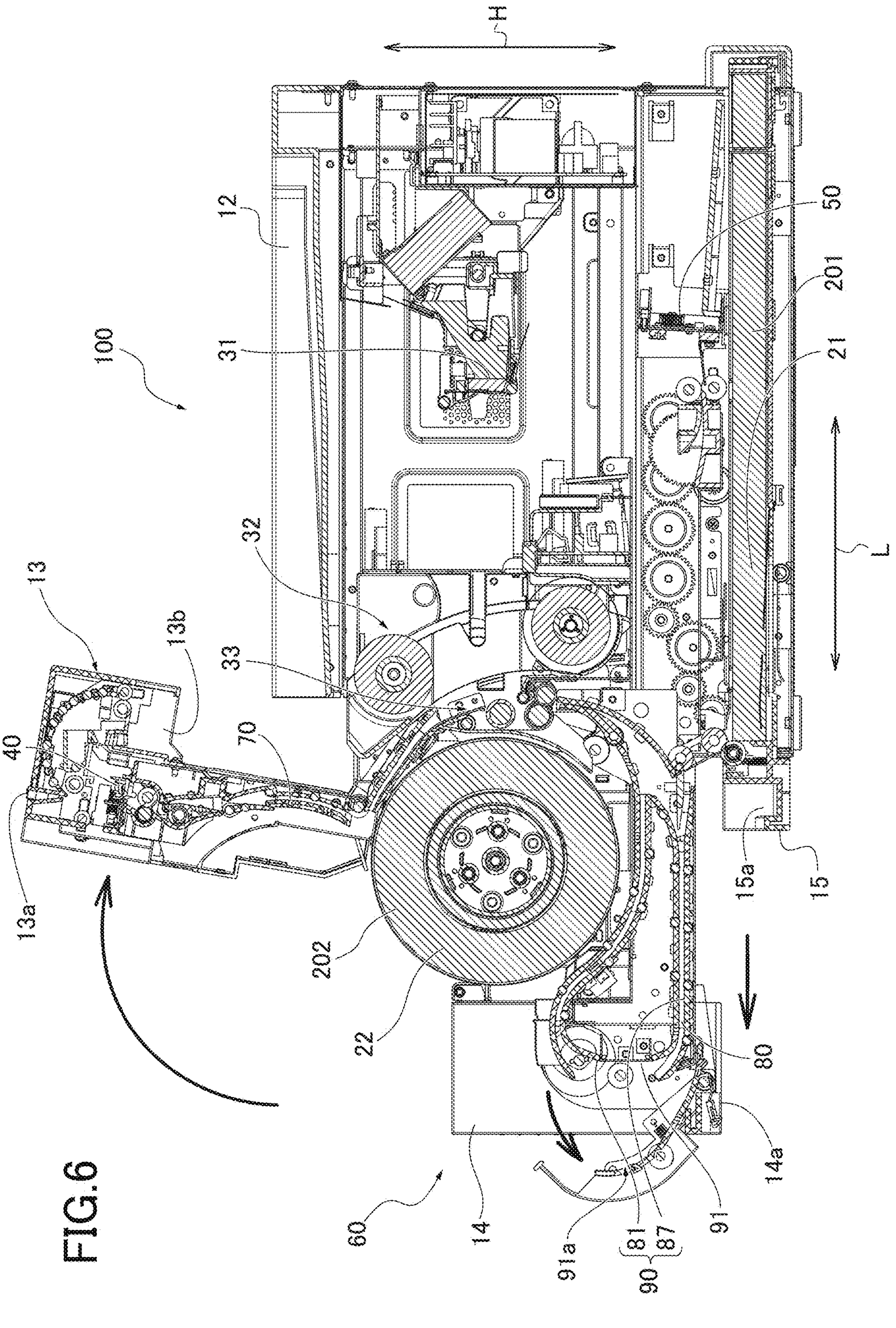
FIG. 6 is a sectional view of the printer illustrated in FIG. 4, corresponding to FIG. 2.

A configuration is described. FIG. 1 is a perspective view illustrating an external of a sublimation thermal printer 100 (hereinafter referred to as printer 100). FIG. 2 is a sectional view of the printer 100 in the vertical plane along a front and back direction L through a center of the printer 100 in the width direction W. FIG. 3 is a simplified schematic view of FIG. 2 for clarity of a carrying path 80 illustrated in FIG. 2. FIG. 4 is a perspective view illustrating the printer with a front upper cover 13 open and a roll paper housing 22 drawn forward in the front and back direction L. FIG. 5 is a front view of the printer 100 from the front of the printer illustrated in FIG. 4. FIG. 6 is a sectional view of the printer illustrated in FIG. 4, corresponding to FIG. 2.

The illustrated printer 100 is an embodiment of the printer according to the present disclosure. The printer 100 includes a case 10, a sheet paper housing 21, a roll paper housing 22, a print portion 30, a cutter 40, a line-making portion 50, a carrier 70, and a carrying path 80.

A case is described. The case 10 includes a case body 11, a top cover 12, a front upper cover 13, a front middle cover 14, and a front lower cover 15, as illustrated in FIG. 1. The case body 11 is mainly formed to cover both sides in the width direction W and the rear side in the front and back direction L.

The top cover 12 is disposed to close the top opening of the case body 11 in a height direction H, and includes a concave inside portion 12*a* surrounded by both side edges and a rear side edge of an outer edge of the top cover 12. The concave inside portion 12*a* opens at a front side edge of the outer edge of the top cover 12. The concave inside portion

12*a* is used as a stacker in which sheet paper 201 (hereinafter simply referred to as paper 201) and paper 203 (hereinafter simply referred to as paper 203) unwound from roll paper 202 are stacked.

A bottom 12*b* of the concave portion 12*a* of the top cover 12 is formed with an inclination, so that it is lowered from rear to front, as illustrated in FIG. 2. Therefore, the paper 201, 203 discharged from an upper discharge port 13*b* of the front upper cover 13, which will be described later, is accumulated on the front side at the bottom 12*b* of the concave portion 12*a* due to the inclination of the bottom 12*b*.

The front upper cover 13 is disposed in the upper portion of the front side of the printer 100, the front lower cover 15 is disposed in the lower portion of the front side of the printer 100, and the front middle cover 14 is disposed between the front upper cover 13 and the front lower cover 15 on the front side of the printer 100.

An internal drawer is described. The front upper cover 13 and the front middle cover 14 are provided in an internal drawer 60 (example of drawer) as illustrated in FIGS. 4, 6. The internal drawer 60 is disposed inside the interior surrounded by the case body 11 and the top cover 12, and is drawable to the case body 11 and the top cover 12 by hanging a finger on a finger hanging portion 14*a* formed in the lower portion of the front middle cover 14 and drawing forward in the front and back direction L.

The internal drawer 60 is integrally equipped with, in addition to the front upper cover 13 and the front middle cover 14, a roll paper housing 22, an ink ribbon 32 and a platen roller 33 of a print portion 30, the cutter 40, the carrier 70, and the carrying path 80.

The front upper cover 13 is supported to be rotatable toward the upper rear as indicated by the arrows in FIGS. 4, 6 with the internal drawer 60 drawn forward from the interior surrounded by the case body 11 and the top cover 12 as illustrated in FIGS. 4, 6 from the closed state illustrated in FIG. 1. When the front upper cover 13 rotates upward and rearward to open, it opens a portion of the front and the top of the roll paper housing 22. This exposes the roll paper housing 22 formed inside the case 10, so that the roll paper 202 can be inserted and removed from the roll paper housing 22.

A front discharge port 13*a* is formed on the front side of the front upper cover 13 to discharge the printed paper 201, 203 to the front, and an upper discharge port 13*b* is formed on the rear side of the front upper cover 13 to discharge the printed paper 201, 203 to the stacker formed on the top cover 12.

FIGS. 4, 5, 6 illustrate the printers, respectively, with a waste box 16 (see FIGS. 1, 2) attached to the front middle cover 14 removed. The waste box 16 is a portion that is disposed below the after described cutter 40 to house the pieces of paper cut by the cutter 40 and separated from the paper 201, 203, and is attached so that it can be removed from the front middle cover 14 by sliding it upward to the front middle cover 14.

Thus, the waste box 16 cannot be removed from the front middle cover 14 when the front upper cover 13 is closed, but can be removed from the front middle cover 14 with the front upper cover 13 open. Chips and other collected in the waste box 16 can be removed when the waste box 16 is removed from the front middle cover 14.

The front lower cover 15 is formed in the front of the tray-like sheet paper housing 21 as illustrated in FIGS. 2, 6 (front lower cover 15 is a part of sheet paper housing 21).

A sheet paper housing is described. The sheet paper housing 21 is provided at the bottom of the printer 100 and is disposed below the roll paper housing 22 as illustrated in FIG. 2. The sheet paper housing 21 houses the sheet paper 201 precut to a predetermined size to be stacked in the thickness direction.

The sheet paper housing 21 is provided to be drawable forward to the case body 11 and the top cover 12 independently of the internal drawer 60 by hanging a finger on the finger hanging portion 15*a* formed in the upper portion of the front lower cover 15 and drawing it forward in the front and back direction L. The sheet paper housing 21 is open at the top when it is drawn forward to the case body 11 and the top cover 12, and the sheet paper 201 to be stored inside can be inserted and removed from the open top.

A roll paper housing is described. The roll paper housing 22 is formed in the internal drawer 60 as described above. The roll paper housing 22 houses the roll paper 202 in which long sheet paper 203 is rolled. The roll paper housing 22 houses the roll paper 202 in an orientation in which the axis of the roll paper 202 is parallel to the width direction W of the printer 100 as illustrated in FIGS. 2, 4-6.

The roll paper housing 22 is disposed above the sheet paper housing 21 when the internal drawer 60 is housed inside the case 10 as illustrated in FIG. 2. The roll paper 202 is disposed in a counterclockwise rotating orientation in FIG. 2 as the paper 203 is drawn out and unwound from the bottom end of the roll paper 202 in the right direction shown in the figure.

A print portion is described. The print portion 30 is located behind the roll paper housing 22. The print portion 30 prints on the paper 201, 203 that passes through a portion (after described print path 82) of the carrying path 80 that stands up in a substantial vertical direction behind the roll paper housing 22 under the control of a controller of the printer 100, which is not illustrated.

The print portion 30 includes a thermal head 31, an ink ribbon 32, and a platen roller 33. The ribbon of the ink ribbon 32 is coated with a sublimation dye. The ink ribbon 32 is fed from a feeding side roll 32*a* to a winding side roll 32*b* in synchronization with the carrying of the paper 201, 203, and the sublimation dye of the ink ribbon 32 is diffusion-transferred to the paper 201, 203 by the heat generated by the thermal head 31 in contact with the ink ribbon 32, thereby making a print.

The ink ribbon 32 is provided in the internal drawer 60. The internal drawer 60 is drawn forward from the case body 11 as illustrated in FIGS. 4, 6, and with the front upper cover 13 not rotated upward and backward, the ink ribbon 32 is passed in an arc above the roll paper housing 22 to be drawn forward.

This allows the ribbon 32 of the internal drawer 60 to be taken out above the open space between the top cover 12 and the front upper cover 13, making it easier to replace the ink ribbon 32.

The platen roller 33 is disposed on the opposite side of the ink ribbon 32 and the thermal head 31 across the paper 201, 203. The platen roller 33 presses the paper 201, 203 to the ink ribbon 32.

A cutter is described. The cutter 40 is disposed in front of the roll paper housing 22 and inside the front upper cover 13. The cutter 40 cuts the paper 201, 203 that passes through a portion (after described discharge path 83) of the carrying path 80 extending from above the roll paper housing 22 to the front along the width direction W under the control of the controller of the printer 100, which is not illustrated. The cut pieces of the cut paper 201 fall and are collected inside the waste box 16 located below the cutter 40.

A line-making portion is described. The line-making portion 50 is located behind the roll paper housing 22. The location of the line-making portion 50 is above the sheet paper housing 21 and also below the print portion 30. The line-making portion 50 forms a line, which is a concave extending along the width direction W, on the sheet paper 201 passing through a portion (after described line-making path 88) of the carrying path 80 extending below the roll paper housing 22 along the front and back direction L under the control of the controller of the printer 100, which is not illustrated.

The line formed on the paper 201 by the line-making portion 50 guides the fold line of the paper 201, for example, to improve the two-page spread of each sheet paper 201 when a photobook is made by bundling the several printed sheet paper 201, or to form the fold of the center of a greeting card made from the single sheet paper 201.

A carrying path is described. The carrying path 80 is a passage through which the paper 201, 203 is carried. The portion of the carrying path 80 in which the sheet paper 201 is carried is described first.

The portion of the carrying path 80 through which the sheet paper 201 is carried includes a paper feeding path 81, a print path 82, a discharge path 83, a front discharge path 84, an upper discharge path 85, a print upstream path 86, a print downstream path 87, and a line-making path 88, as illustrated by single-dotted lines in FIGS. 2, 3.

The paper feeding path 81 extends upward from the front end of the sheet paper housing 21, folds backward and downward in the space formed in front of the roll paper housing 22 and behind the front middle cover 14, and extends below the roll paper housing 22 and above the sheet paper housing 21 toward the rear of the roll paper housing 22, and furthermore, the paper feeding path 81 is formed to an upwardly standing position at the rear of the roll paper housing 22.

The print path 82 follows the paper feeding path 81, extends to rise upward along the rear of the roll paper housing 22 in the rear of the roll paper housing 22, and further extends forward above the roll paper housing 22 to the front above the roll paper housing 22. The aforementioned print portion 30 is located in the print path 82.

The discharge path 83 follows the print path 82 and extends forward along the front and back direction L from the front above the roll paper housing 22. The aforementioned cutter 40 is disposed in the discharge path 83. The discharge path 83 extends to a position forward of the cutter 40.

The front discharge path 84 follows the discharge path 83 and extends forward to the front discharge port 13*a*. The upper discharge path 85 follows the discharge path 83 and extends upward and backward to the upper discharge port 13*b* while curving.

A discharge path switching member 71 is provided at the junction of the front discharge path 84 and the upper discharge path 85. The discharge path switching member 71 is rotatable, and can be operated by rotating the discharge path switching member 71 up and down with a finger or the like from the front side of the front upper cover 13. In the state illustrated in FIG. 2, the discharge path switching member 71 rotates to the upper side of the rotatable range on the front side of the front upper cover 13, and at the junction between the front discharge path 84 and the upper discharge path 85, it rotates to the lower side of the rotatable range.

At the junction, when the discharge path switching member 71 rotates to the lower side, the paper 201, 203 that has traveled forward in the discharge path 83 is switched to travel to the upper discharge path 85, and when the discharge path switching member 71 rotates to the upper side, the paper 201, 203 that has traveled forward in the discharge path 83 is switched to travel to the front discharge path 84.

The print upstream path 86 follows the print path 82 and extends from the front above the roll paper housing 22, concentric with the circumference of the roll paper housing 22, downward toward the roll paper housing 22, to a position just before it contacts the paper feeding path 81.

A print discharge switching flap 72 is provided at the junction of the print upstream path 86 and the discharge path 83. The print discharge switching flap 72 is provided in a rotatable manner, so that the leading end can be displaced up and down, and the print discharge switching flap 72 rotates under the control of the controller of the printer 100, which is not illustrated in the figure. In the state illustrated in FIG. 2, the print discharge switching flap 72 has its leading end positioned at the lower side within the displaceable range.

When the print discharge switching flap 72 is positioned with the leading end at the bottom in the displaceable range, the paper 201 which has traveled forward in the print path 82 is switched to travel to the discharge path 83, and when the print discharge switching flap 72 is positioned with the leading end at the top in the displaceable range, the paper 201 which has traveled forward in the print path 82 is switched to travel to the print upstream path 86.

The print downstream path 87 follows the end portion of the print path 82 on the side of the paper feeding path 81, and extends from behind the roll paper housing 22 toward the front, below the roll paper housing 22, below the paper feeding path 81, and above the sheet paper housing 21, and the front leading end of the print downstream path 87 rises upward and smoothly merges with the paper feeding path 81, which also rises upward.

The flip portion 90 that flips the front and back sides of the paper 201 is described here. The paper 201 is printed on a plane that the ink ribbon 32 contacts in the print path 82, that is, a plane facing backward in the front and back direction L in FIGS. 2, 3. The printed plane in the print path 82 faces downward in the height direction H when the paper 201 is carried to the print downstream path 87.

When the paper 201 is carried forward in the print downstream path 87 to join the paper feeding path 81, which rises upward, and is carried in the paper feeding path 81, the printed plane faces upward in the height direction H below the roll paper housing 22.

Furthermore, when the paper 201 is carried backward in the paper feeding path 81 and then is carried in the print path 82 that rises upward, the printed plane faces forward in the front and back direction. In other words, the paper 201 is turned over while being carried from the print downstream path 87 to the paper feeding path 81, and the front and back sides are flipped. Therefore, the print downstream path 87 and the paper feeding path 81 constitute the flip portion 90 that flips the front and back sides of the paper 201. Since the flip portion 90 is a part of the carrying path 80, it is provided in the internal drawer 60 similar to the other portions of the carrying path 80.

As illustrated in FIG. 3, an upward convex curved portion M1 of the feeding path 81, which corresponds to at least a part of the flip portion 90, is a portion that flips the carrying direction of the sheet paper 201 carried in the feeding path 81 from upward to downward, and is formed in front of the roll paper housing 22 and overlaps with the roll paper housing 22 when viewed from the front (front of front and back direction L) to the rear of the printer 100 in the front and back direction L. The curved portion M1 is formed with a radius of curvature of 30 mm, for example.

If the radius of curvature of the curved portion M1 is smaller than 30 mm, the smoothness of the carrying of the sheet paper 201 may be lost. It is therefore preferable for the radius of curvature to be 30 mm or more. However, the radius of curvature of the curved portion M1 is not limited to 30 mm or more, but can be set to less than 30 mm depending on the thickness and the material of the paper 201, 203 to be used.

Some sheet paper 201 may be difficult to lose the smoothness of the carrying by the curved portion M1, depending on the thickness and the material. In the case of such sheet paper 201, it is possible to select and use the sheet paper 201 that is difficult to lose the smoothness of the carrying if the radius of curvature of the curved portion M1 is 20 mm or more.

A portion M2 of the paper feeding path 81 and the print downstream path 87, which passes below the roll paper housing 22, and corresponds to at least another portion of the flip portion 90, is formed below the roll paper housing 22, and overlaps with the roll paper housing 22 when viewed from the top of the printer 100 to the below in the height direction H.

On the other hand, the flip portion 90 does not overlap with the roll paper housing 22 at all when the other side direction is viewed from the side of the printer 100 in in the width direction W.

The line-making path 88 extends backward from the rear of the opposite side of the paper feeding path 81 of the print downstream path 87, not upward toward the print path 82, but slightly downward toward the line-making portion 50. The aforementioned line-making portion 50 is disposed in the line-making path 88.

Figure 11:
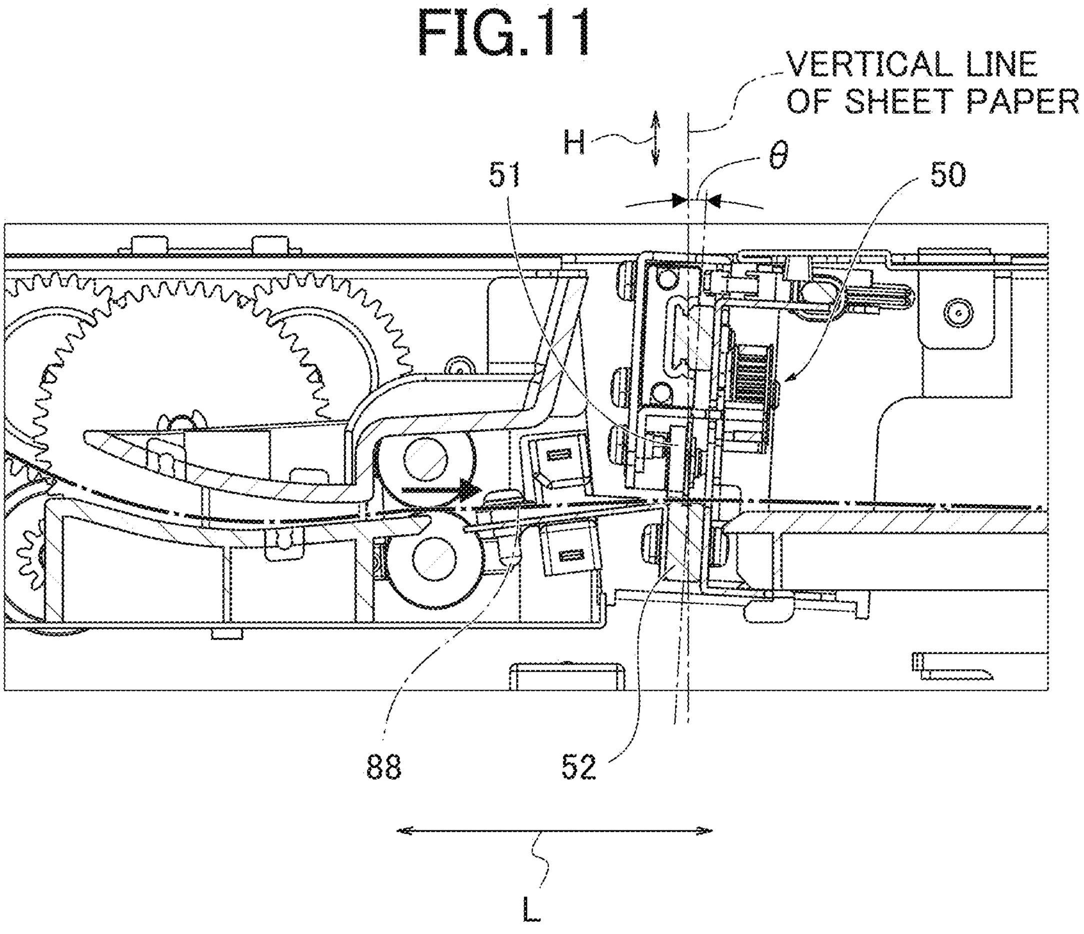
FIG. 11 is a partial enlarged view illustrating details of a line-marking portion and a line-marking path in FIG. 2.

FIG. 11 is an enlarged partial view illustrating details of the line-making portion 50 and the line-making path 88 in FIG. 2. As illustrated in FIG. 11, the line-making path 88 is formed, between a rotary blade 51 (rotating blade for making line) and a receiving member 52 (member disposed to face rotary blade 51 and formed with a groove extending in a straight line in direction in which rotary blade 51 moves as it rotates), which constitute the line-making portion 50, such that the sheet paper 201 when passing through the line-making portion 50 (between rotary blade 51 and receiving member 52) along the line-making path 88 rises backward (rightward in FIG. 11) at an angle of 2 degrees relative to the horizontal.

On the other hand, as illustrated in FIG. 11, the line-making portion 50 is disposed such that the direction in which the rotary blade 51 and the receiving member 52 are aligned (strictly speaking, direction in which blade of rotary blade 51 and groove of receiving member 52 are aligned) is inclined backward at an angle of 3 degrees relative to the height direction H (vertical direction) of the printer 100. Therefore, the portion of the sheet paper 201 that passes between the blade of the rotary blade 51 and the groove of the receiving member 52 is in a posture inclined backward at a relative angle θ=5 degrees relative to the vertical line of the portion of the sheet paper 201 (direction inclined forward at angle 2 degrees relative to height direction H of printer 100).

In this way, the line-making portion 50 is disposed in a posture inclined backward at a relative angle θ relative to the sheet 201 on which a line is made, so that when the sheet 201 enters the line-making portion 50 from the line-making path 88 at a backward angle of 5 degrees, the leading end of the sheet paper 201 in the direction of travel is difficult to be caught by the groove edge of the receiving member 52 arranged on the lower side of the sheet paper 201. As a result, the occurrence of paper jams of the sheet paper 201 caused by the leading end of the sheet paper 201 caught on the edge of the groove of the receiving member 52 can be prevented or suppressed.

The relative angle θ is 5 degrees in this embodiment, but it is not limited to 5 degrees, and can be applied in a range of 2 to 20 degrees, for example. The relative angle θ is preferably 3 to 10 degrees.

For example, in a configuration in which the width of the groove of the receiving member 52 is formed at 5 mm and the blade of the rotary blade 51 is positioned at the center of the width of the groove, when the angle θ is less than 2 degrees, the leading end of the sheet paper 201 is less likely to be caught in the groove of the receiving member 52 and when the angle θ is more than 20 degrees, unnecessarily raised bending was formed in the vicinity of the lines formed on the sheet paper 201.

A print line-making switching flap 74 is provided at the junction of the portion of the print downstream path 87 toward the print path 82 and the line-making path 88. The print line-making switching flap 74 is vertically displaceable, and in the state illustrated in FIG. 2, the leading end of the print line-making switching flap 74 is pressured to the upper side of the displaceable range by a spring, which is not illustrated in the figure.

In the displaceable range of the print line-making switching flap 74, with the leading end of the flap 74 being pressed to the upper side, when the paper 201 is carried from the print path 82 to the print downstream path 87, the paper 201 presses the print line-making switching flap 74 against the biasing force of the spring to the lower side of the displaceable range of the leading end of the flap 74, and then advances to the print downstream path 87.

When the paper 201 that has advanced from the print path 82 to the print downstream path 87 completely passes through the print line-making switching flap 74, the leading end of the print line-making switching flap 74 is in the state of being pressed to the upper side, so that the paper 201 in the print downstream path 87 is not carried to the print path 82 side, but is switched to advance to the line-making path 88. In addition, when the paper 201 that has advanced from the print path 82 to the print downstream path 87 has not fully passed through the print line-making switching flap 74, the paper 201 in the print downstream path 87 is in a state where the leading end of the print line-making switching flap 74 is lowered, so that the paper 201 in the print downstream path 87 is not carried to the line-making path 88 side and advances to the print path 82.

The print line-making switching flap 74 may rotate by the control of controller of the printer 100, which is not illustrated in the figure.

Next, a portion of the carrying path 80 in which the paper 203 unwounded from the roll paper 202 is carried is described. The portion of the carrying path 80 in which the paper 203 unwound from the roll paper 202 is carried includes a roll paper feeding path 89 as illustrated by the single-dotted line in FIGS. 2, 3, in addition to the portion where the above-described sheet paper 201 is carried.

The roll paper feeding path 89 extends from the approximate bottom of the roll paper 202 stored in the roll paper housing 22 toward the rear and is formed to an upwardly standing position at the rear of the roll paper housing 22.

A paper feeding switching flap 73 is provided where the paper feeding path 81 and the roll paper feeding path 89 meet. The paper feeding switching flap 73 is provided in such a way that the leading end can be rotatable to displace back and forth, and in the state illustrated in FIG. 2, the leading end of the paper feeding switching flap 73 is pressed to the front of the displaceable range by a spring, which is not illustrated in the figure.

In the displaceable range of the paper feeding switching flap 73, when the leading end is biased to the front side, the paper 201 carried through the paper feeding path 81 is switched to advance to the print path 82, and the paper 201 carried from the print path 82 is switched to advance to the print downstream path 87.

On the other hand, in the displaceable range of the paper feeding switching flap 73, with the leading edge being biased to the front side, when the paper 203, which has unwound from the roll paper 202 and carried through the roll paper feeding path 89, advances toward the print path 82, the paper 203 presses the paper feeding switching flap 73 against the biasing force of the spring to the rear of the displaceable range of the leading end and advances to the print path 82.

When the paper 203 unwound from the roll paper 202 is printed in the print portion 30 of the print path 82, the paper 203 is still not separated from the roll paper 202, so that the paper feeding switching flap 73 remains pressed by the portion of the paper 203 that passes through the roll paper feeding path 89 to the rear of the displaceable range of the leading end.

The paper feeding switching flap 73 may also rotate by the control of the control unit of the printer 100, which is not illustrated in the figure.

A carrier is described. The carrier 70 has a sheet paper feeding roller 77*a*, a paper feeding roller 77*b*, a reverse roller 77*c*, a grip roller 77*d*, a first feeding roller 77*e*, a first discharge roller 77*f*, a second discharge roller 77*g*, a second feeding roller 77*h*, and a roll paper feeding roller 77*i*.

Each of these carrying rollers 77*a*-77*i* contacts at least one of the sheet paper 201 and the paper 203, either front side or back side, and rotates under the control of the controller of the printer 100, which is not illustrated in the figure, to carry the paper 201, 203 along the carrying path 80.

The sheet paper feeding roller 77*a* is disposed above the front end of the sheet paper housing 21. The sheet paper feeding roller 77*a* contacts the topmost sheet paper 201 of the sheet paper 201 housed in the sheet paper housing 21 and feeds the sheet paper 201 into the feeding path 81 by rotating. The sheet paper feeding roller 77*a* rotates in the opposite direction of the feeding direction to pull the sheet paper 201 that has been fed into the feeding path 81 back into the sheet paper housing 21.

The paper feeding roller 77*b* is disposed in the paper feeding path 81 in close proximity to the sheet paper feeding roller 77*a*. The paper feeding roller 77*b* contacts the sheet paper 201 fed into the paper feeding path 81 by the sheet paper feeding roller 77*a* and carries the sheet paper 201 upward along the paper feeding path 81. The paper feeding roller 77*b* also rotates in the opposite direction of the feeding direction described above to pull back the sheet paper 201.

The reverse roller 77*c*, the grip roller 77*d*, the first feeding roller 77*e*, the first discharge roller 77*f*, the second discharge roller 77*g*, and the second feeding roller 77*h*, described below, also rotate in the opposite direction of their respective carrying directions to pull back the sheet paper 201, similar to the paper feeding roller 77*b*.

The reverse roller 77*c* is disposed in a portion of the paper feeding path 81 that is higher than the paper feeding roller 77*b*. The reverse roller 77*c* contacts the sheet paper 201 advanced along the paper feeding path 81 by the paper feeding roller 77*b* and carries the sheet paper 201 along the paper feeding path 81 toward the print path 82.

The grip roller 77*d* is disposed in the print path 82, on the side closer to the paper feeding path 81 and ahead of the leading end of the paper feeding switching flap 73. The grip roller 77*d* contacts the sheet paper 201 carried to the print path 82 and carries the sheet paper 201 through the print portion 30 toward the discharge path 83 or the print upstream path 86. At this time, the paper feeding switching flap 73 is switched to the front side, allowing the sheet paper 201 carried through the paper feeding path 81 to be carried into the print path 82.

The first feeding roller 77*e* is disposed in the discharge path 83, on the side closer to the print path 82 than the cutter 40. The first feeding roller 77*e* contacts the sheet paper 201 carried to the discharge path 83 and carries the sheet paper 201 through the cutter 40 to the first discharge roller 77*f*.

The first discharge roller 77*f* is disposed near the end portion of the discharge path 83, on the far side from the print path 82 and in front of the discharge path switching member 71. The first discharge roller 77*f* contacts the sheet paper 201 carried to the discharge path 83 and carries the sheet paper 201 to the front discharge path 84 or the upper discharge path 85, depending on the position of the discharge path switching member 71.

The second discharge roller 77*g* is disposed in the upper discharge path 85 near the upper discharge port 13*b*. The second discharge roller 77*g* contacts the sheet paper 201 carried to the upper discharge path 85 and discharges the sheet paper 201 from the upper discharge port 13*b* to the concave portion 12*a* that serves as the stacker of the top cover 12.

The second feeding roller 77*h* is disposed in the line-making path 88 and contacts the sheet paper 201 carried to the line-making path 88 to carry the sheet paper 201 to the line-making portion 50.

The roll paper feeding roller 77*i* is disposed in the roll paper feeding path 89, on the side near the print path 82 and in front of the leading end of the paper feeding switching flap 73. The roll paper feeding roller 77*i* contacts the paper 203 wound around the outermost circumference of the roll paper 202 stored in the roll paper housing 22 and, by rotating, feeds the paper 203 toward the grip roller 77*d*.

The roll paper feeding roller 77*i* also rotates in the opposite direction of the feeding direction to rewind the paper 203 fed toward the grip roller 77*d* to the roll paper 202 in the roll paper housing 22.

An operation is described. The operation of the printer 100 configured as described above is described. First, the operation of the printing on the sheet paper 201 is described.

Figure 7:
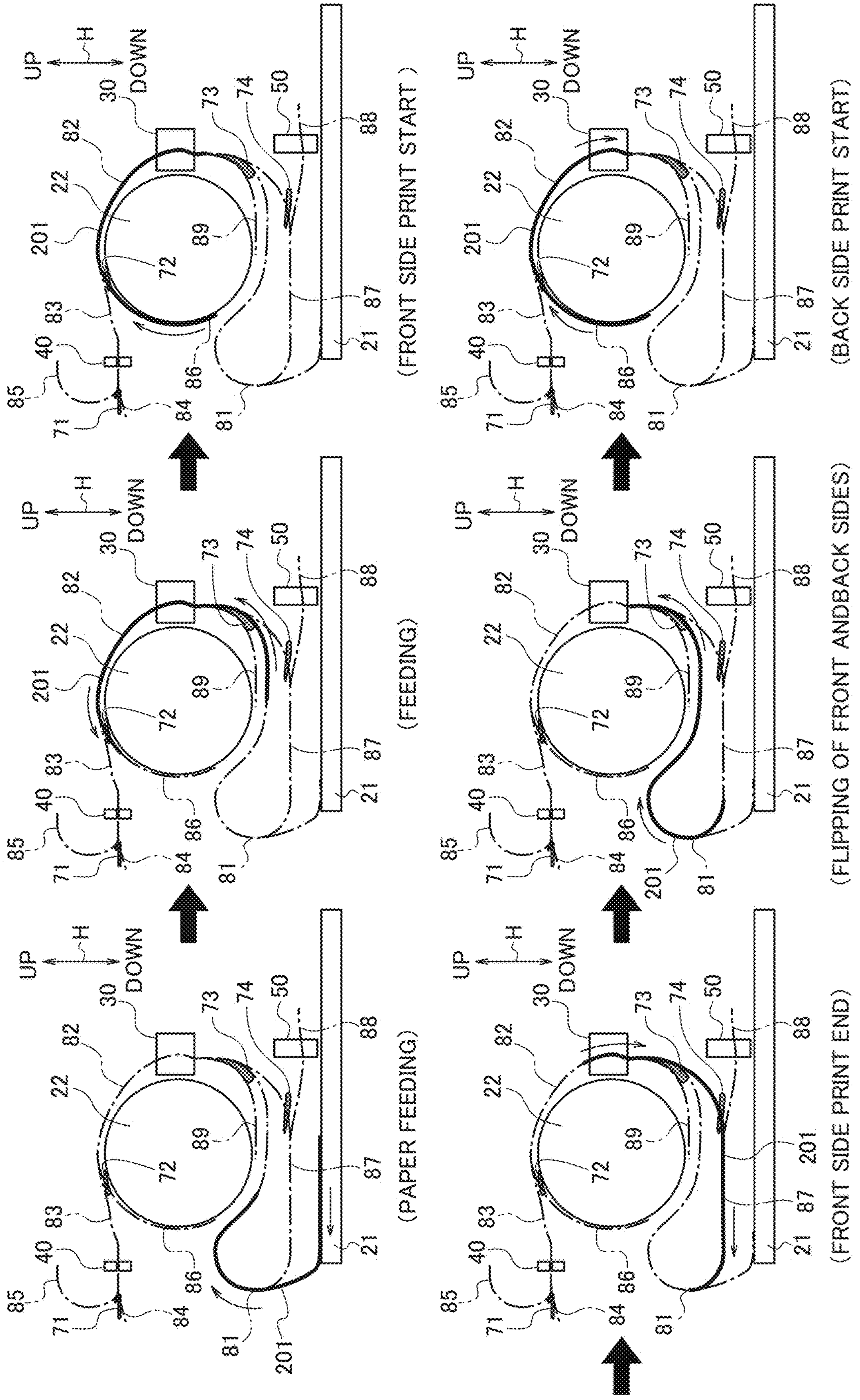
FIG. 7 is a simplified sectional view (No. 1) corresponding to FIG. 3, illustrating schematically the movement of the sheet paper when the printer prints on both front and back sides of the sheet paper.
Figure 8:
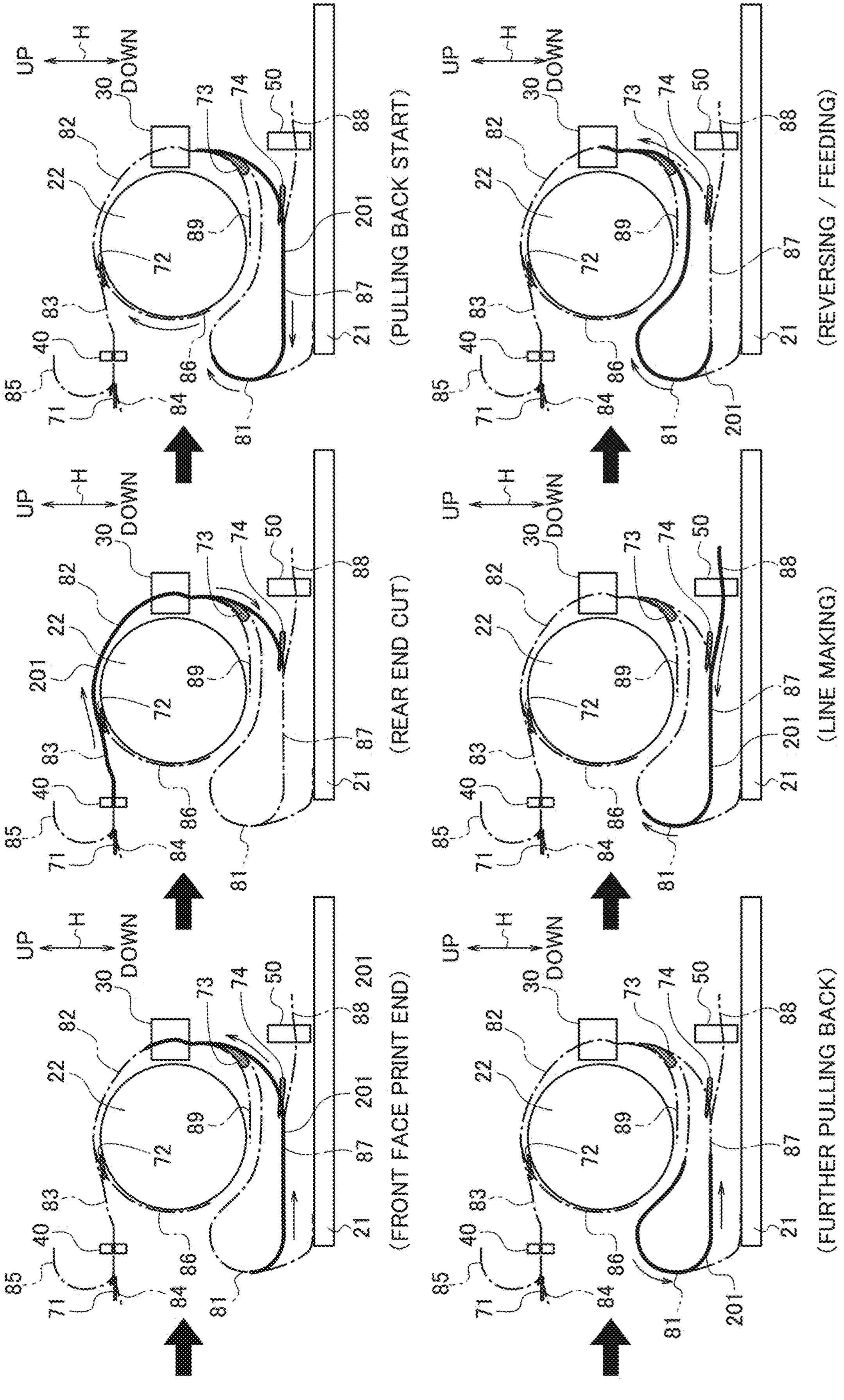
FIG. 8 is a simplified sectional view (No. 2) corresponding to FIG. 3, illustrating schematically the movement of the sheet paper when the printer prints on both the front and back sides of the sheet paper.
Figure 9:
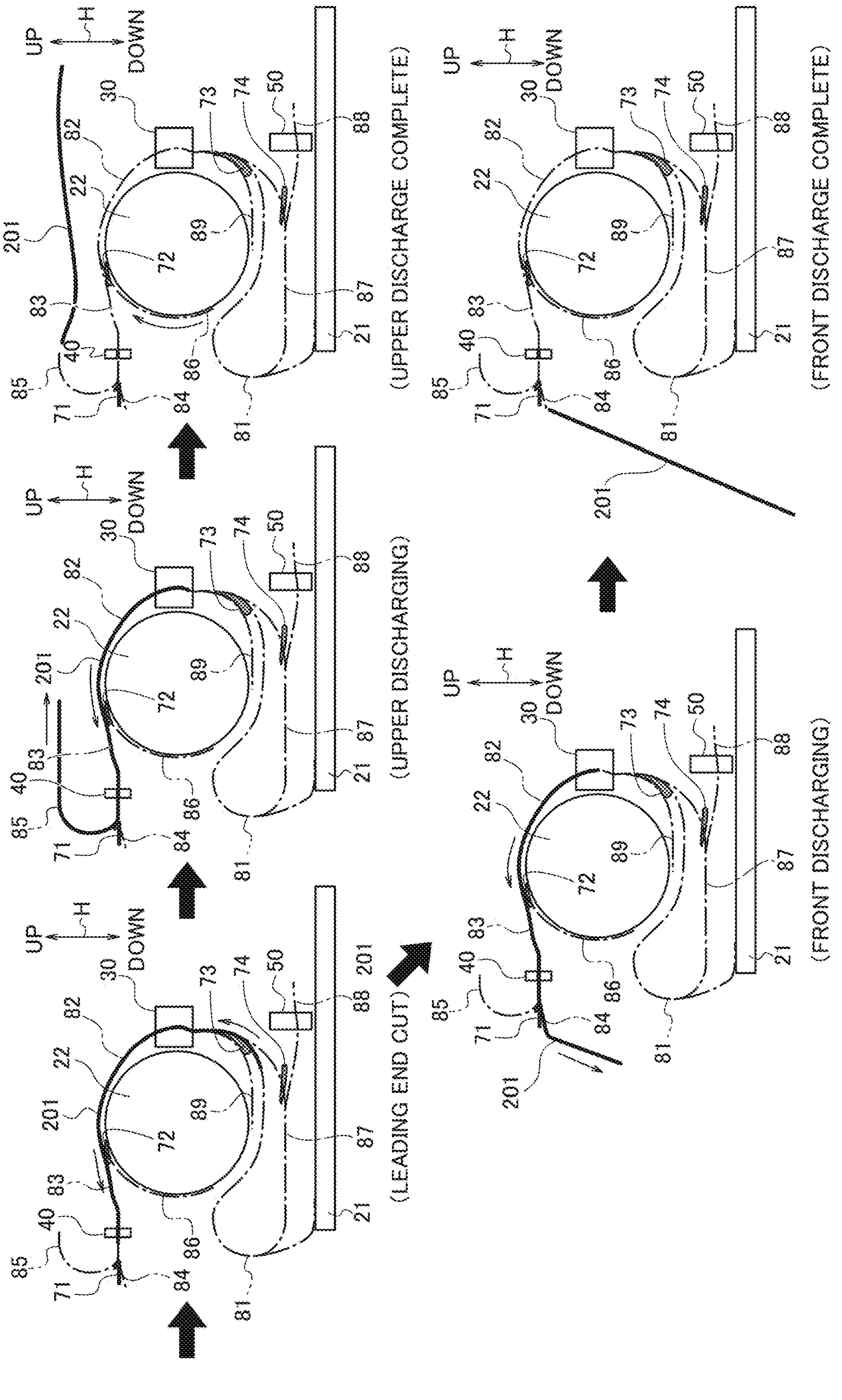
FIG. 9 is a simplified sectional view (No. 3) corresponding to FIG. 3, illustrating schematically the movement of the sheet paper when the printer prints on both the front and back sides of the sheet paper.
Figure 10:
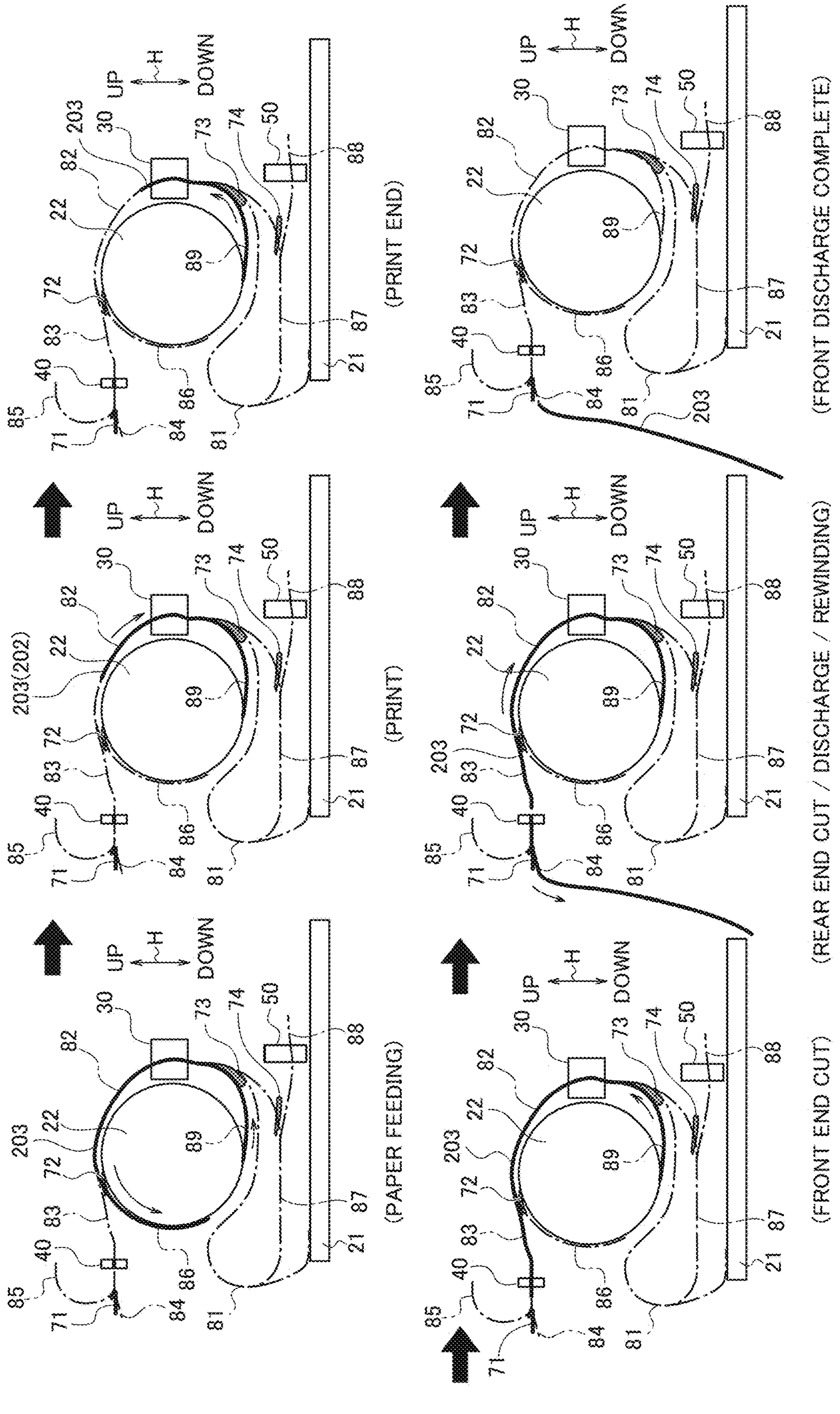
FIG. 10 is a simplified sectional view corresponding to FIG. 3, illustrating schematically the movement of the paper when the printer prints on roll paper.

FIGS. 7, 8, 9 are simplified sectional views, equivalent to FIG. 3, that schematically illustrate the movement of the sheet paper 201 when the printer 100 prints on the front and back sides of the sheet paper 201. FIG. 10 is a simplified sectional view, equivalent to FIG. 3, that schematically illustrates the movement of the paper 203 when the printer 100 prints on the roll paper 202.

An operation on sheet paper is described. The operation of the printer 100 printing on and discharging the sheet paper 201 is described with reference to FIGS. 7 to 9.

First, the sheet paper feeding roller 77*a* (see FIG. 2. Hereinafter is the same) rotates, so that one sheet of the sheet paper 201 stacked on the uppermost layer of the sheet paper

201 housed in the sheet paper housing 21 is fed into the paper feeding path 81, and by the rotation of the sheet paper feeding roller 77*b* and the reverse roller 77*c*, is then carried in the arrow direction along the paper feeding path 81, as illustrated in the upper left of FIG. 7.

Here, by switching the paper feeding switching flap 73, the sheet paper 201 is carried to the print path 82, as illustrated in the upper center of the figure, and is advanced through the print path 82 by the rotation of the grip roller 77*d*, and then is guided to the print upstream path 86 by switching the print discharge switching flap 72, as illustrated on the upper right of FIG. 7.

When the sheet paper 201 advances to the end of the print upstream path 86, the grip roller 77*d* reverses (direction of rotation becomes opposite), and the sheet paper 201 advances through the print portion 30 to the print downstream path 87 while being printed on the front side of the sheet paper 201, as illustrated in the lower left of FIG. 7.

Here, when the color printing is performed on the front side of the sheet paper 201, and when the overcoating is further performed by the ink ribbon 32 after substituting the color of the ink ribbon 32, the carrying and the printing are repeated between the upper right and lower left states of FIG. 7 by switching the direction of the rotation of the grip roller 77*d*. Then, the processes of the color printing and the overcoating of the front side are completed.

When the printing on the front side of the sheet paper 201 is completed, the sheet paper 201 is carried to the paper feeding path 81 by the rotation of the reverse roller 77*c*, and the front and back sides are flipped by passing through the flip portion 90 formed by the print downstream path 87 and the paper feeding path 81, as illustrated in the bottom center of FIG. 7 from the state in the bottom left of FIG. 7. In other words, the sheet paper 201 is turned over by passing through the flip portion 90, and the side to be printed by the print portion 30 in the print path 82 is flipped.

The sheet paper 201, which has been flipped by the flip portion 90, is carried from the bottom center of FIG. 7 to the end of the print upstream path 86, as illustrated in the bottom right of FIG. 7, by the rotation of the grip roller 77*d*, which is reversed again.

When the sheet paper 201 advances to the end of the print upstream path 86, the grip roller 77*d* reverses again, and the sheet paper 201 passes through the print portion 30 and advances to the print downstream path 87 while being printed on the front side of the sheet paper 201, as illustrated in the upper left of FIG. 8.

Here, when the color printing is performed on the rear side of the sheet paper 201, and the overcoating is further performed by the ink ribbon 32 after substituting the color of the ink ribbon 32, the carrying is repeated between the bottom right state of FIG. 7 and the top left state of FIG. 8. Then, the processes of the color printing and the overcoating on the rear side are completed.

When the printing on the rear side of the sheet paper 201 is completed, the grip roller 77*d* reverses again. As illustrated in the upper center of FIG. 8 from the upper left of FIG. 8, the sheet paper 201 passes through the print path 82, the print discharge switching flap 72 is switched, and the sheet paper 201 is carried to the discharge path 83.

In the discharge path, the rotation of the first feeding roller 77*e* advances the sheet paper 201 to the cutter 40, and the unnecessary portion at the rear end of the sheet paper 201 is cut by the cutter 40, as illustrated in the upper center of FIG. 8. The cut unnecessary portion falls into the waste box 16 (see FIG. 2) disposed below the cutter 40 and is collected in the waste box 16.

The sheet paper 201 of which the unnecessary portion at the rear end is cut off is carried through the discharge path 83 toward the print path 82 by the reversing of the first feeding roller 77*e*, and then is pulled back to the print downstream path 87 through the print path 82 as illustrated on the upper right of FIG. 8 by the reversing of the grip roller 77*d* again. Further, by the rotation of the reverse roller 77*c*, a portion of the front side of the sheet paper 201, in the transport direction, is pulled back to the paper feeding path 81, as illustrated in the lower left of FIG. 8.

Then, with the print line-making switching flap 74 switched to the upper side, the reverse roller 77*c* reverses and the sheet paper 201 is carried to the line-making path 88 as illustrated in the lower center of FIG. 8, and by the rotation of the second feeding roller 77*h*, the front end portion of the sheet paper 201 in the transport direction reaches the line-making portion 50. The line-making portion 50 forms lines in the front end portion of the sheet paper 201 in the carrying direction.

Next, by the rotation of the second feeding roller 77*h* and the reverse roller 77*c*, the sheet paper 201 carried to the line-making path 88 is then carried to the print path 82 through the flip portion 90 including the print downstream path 87 and the paper feeding path 81, as illustrated in the bottom right of FIG. 8. In the print path 82, the grip roller 77*d* reverses again to carry the sheet paper 201 to the discharge path 83, as illustrated in the upper left of FIG. 9, and the sheet paper 201 is carried to the cutter 40 by rotation of the first feeding roller 77*e* in the discharge path 83.

The unnecessary portion at the front end of the sheet paper 201 is then cut by the cutter 40 in the state illustrated in the upper left of FIG. 9. The cut unnecessary portion falls into the waste box 16 (see FIG. 2) disposed below the cutter 40 and is collected in the waste box 16.

The sheet paper 201 of which the front end is cut off passes through the cutter 40 and moves forward by the rotation of the first feeding roller 77*e*. The sheet paper 201 that has moved forward the cutter 40 is carried by the rotation of the first discharge roller 77*f*. When the discharge path switching member 71 is switched to the lower side at the junction, the sheet paper 201 is led to the upper discharge path 85, as illustrated in the upper center of FIG. 9, and the sheet paper 201 is then discharged from the upper discharge port 13*b* as illustrated in the upper right FIG. 9 by the rotation of the second discharge roller 77*g* disposed near the upper discharge port 13*b*.

On the other hand, when the discharge path switching member 71 is switched to the upper side at the junction, the sheet paper 201 is led to the front discharge path 84 as illustrated in the lower left of FIG. 9, and the sheet paper 201 is discharged from the front discharge port 13*a* as illustrated in the lower right of FIG. 9.

An operation to roll paper is described. Next, the operation of the printer 100 printing on and discharging the roll paper 202 is described with reference to FIG. 10.

First, the roll paper feeding roller 77*i* (see FIG. 2. Hereinafter is the same) rotates to unwind the paper 203 from the outermost portion of the roll paper 202 housed in the roll paper housing 22.

Here, by switching the paper feeding switching flap 73 to the rear side and the print discharge switching flap 72 to the upper side, and by rotating the roll paper feeding roller 77*i* and the grip roller 77*d*, the unwound paper 203 is carried through the print path 82 and the print upstream path 86 as illustrated in the upper left of FIG. 10, and is fed by the length required for printing as illustrated in the upper center of FIG. 10.

Next, the fed paper 203 is then pulled back through the print path 82 and the roll paper feeding path 89 by reversing the grip roller 77*d* and the roll paper feeding roller 77*i*, and as illustrated in the upper center of FIG. 10, while the paper 203 passes through the print path 82, the printing on the paper 203 is performed by the print portion 30.

Here, when the color printing is performed on the paper 203, and the overcoating by the ink ribbon 32 is performed after substituting the color of the ink ribbon 32, similar to the sheet paper 201, the carrying in the discharge port direction and the printing in the reversed carrying are repeated, and the processes of the color printing and the overcoating are completed.

As illustrated in the upper right of FIG. 10, when the printing on the paper 203 is completed, by the reversing of the roll paper feeding roller 77*i* and the grip roller 77*d*, the paper 203 is fed through the roll paper feeding path 89 and the print path 82 to the discharge path 83 by switching the print discharge switching flap 72 to the lower side.

In the discharge path 83, as illustrated in the lower left of FIG. 10, the paper 203 passes through the cutter 40 by the rotation of the second feeding roller 77*h*, and the cutter 40 cuts the unnecessary portion of the front end of the paper 203 in the transport direction, if necessary. The cut unnecessary portion of the paper 203 is collected in the waste box 16.

The printed paper 203 after the unnecessary portion has been cut is carried through the front discharge path 84 to the front discharge port 13*a* by switching to the upper side at the junction of the discharge path switching member 71 and rotating the first discharge roller 77*f*.

As illustrated in the bottom center of FIG. 10, when the printed area of the paper 203 passes through the cutter 40, the cutter 40 cuts the paper 203 to separate the paper 203 including the printed area from the paper 203 connected to the roll paper 202.

The paper 203 on the side connected to the roll paper 202 is rewound to the roll paper 202 by reversing the second feeding roller 77*h*, the grip roller 77*d*, and the roll paper feeding roller 77*i*, and the paper 203 cut from the roll paper 202 including the printed area is discharged from the front discharge port 13*a* as illustrated in the lower right of FIG. 10.

By switching the discharge path switching member 71 to the lower side at the junction, the printed paper 203 may be discharged from the upper discharge port 13*b* through the upper discharge path 85.

Effects are described. As described above, the printer 100 in this embodiment can easily flip the front and back sides of the sheet paper 201 by using the flip portion 90 to print on both sides of the sheet paper 201, respectively.

The printer 100 is formed such that at least a portion of the flip portion 90, i.e., the curved portion M1, is formed in front of the roll paper housing 22 and overlaps with the roll paper housing 22 when viewed backward from the front of the printer 100 (front side in front and back direction L) in the front and back direction L.

Therefore, when viewed backward from the front of the printer in the front and back direction, the printer 100 has a smaller dimension in the height direction H than a printer in which the flip portion does not overlap with the roll paper housing at all, thereby reducing the size of the printer 100.

Moreover, at least a portion of the flip portion 90, i.e., the curved portion M1, is formed in front of the roll paper housing 22, so that even if paper jam occurs in the curved portion M1, it is easier to remove the paper 201 jammed in the curved portion M1 by accessing from the front, compared to those in which the flip portion is formed behind the roll paper housing 22.

The printer 100 is formed such that, when viewed from the top of the printer 100 (top in height direction H) downward in the height direction H, at least another portion of the flip portion 90, i.e., the portion M2 of the flip portion 90, which passes below the roll paper housing 22, is formed below the roll paper housing 22 and overlaps with the roll paper housing 22.

Thus, when viewed from the top of the printer downward in the height direction, the printer 100 has a smaller dimension in the front and back direction L than a printer in which the flip portion does not overlap with the roll paper housing at all, thereby reducing the size of the printer 100.

On the other hand, when viewed the other side direction from the side of the printer 100 in the width direction W, the flip portion 90 does not overlap with the roll paper housing 22 at all, so that the front and back sides of the sheet paper 201 are flipped, and both sides of the sheet paper 201 are printed while the roll paper 202 is still stored in the roll paper housing 22.

When the internal drawer 60 is drawn forward and the waste box 16, which is an openable partition in front of the roll paper housing 22, is removed, the printer 100 has, in a front confluence of the print downstream path 87 and the paper feeding path 81 in the flip portion 90, where the direction of the paper 201 to be carried is tuned from the front to the rear, the forward convex curved portion 91 being exposed to the outside. The forward convex curved portion 91 includes the forward facing portion of the forward convex curved portion M1 described above.

Furthermore, the curved portion 91 is formed, such that the outer wall plate 91*a* of the carrying path 80 opens forward as illustrated in FIG. 6.

This allows the printer 100 to expose the carrying path 80 of the curved portion 91 of the flip portion 90 when the wall plate 91*a* opens forward, allowing access from the front to the paper 201 passing through the curved portion 91 of the carrying path 80.

Thus, even if the paper 201 carried to the carrying path 80 is jammed in the curved portion 91, for example, the wall plate 91*a* opens forward to expose the jammed paper 201, thereby facilitating the operation to remove the jammed paper 201.

The printer 100 in this embodiment is a dye-sublimation thermal printer, but the printer according to the present disclosure is not limited to a dye-sublimation thermal printer and may be other printing formats other than a dye-sublimation thermal printer.

In other words, the printer according to the present disclosure may be a thermal printer other than a dye sublimation printer, a non-thermal printer, e.g., an inkjet printer, or any other printing format.

Although the printer 100 in this embodiment includes the line-making portion 50, the printer according to the present disclosure may be a printer without a line-making portion.

The printer 100 in this embodiment has two discharge ports of the front discharge port 13*a* and the upper discharge port 13*b*, but the printer may have only one discharge port or three or more.

The invention claimed is:

1. A printer comprising:

a roll paper housing that houses roll paper;

a sheet paper housing that houses sheet paper;

a print portion that prints on the roll paper and the sheet paper; and a flip portion that flips a side of the sheet paper to be printed on by the print portion, wherein the flip portion includes an upward convex curved portion that flips a carrying direction of the sheet paper from upward to downward and a portion through which the sheet paper passes after printing on a surface of the sheet paper, and at least a part of the portion passes below the roll paper housing to be overlapped therewith, and at least a part of the upward convex curved portion (M1) is arranged to be overlapped with the roll paper housing in a direction orthogonal to a direction in which the roll paper housing portion and the portion are overlapped.

2. The printer according to claim 1, wherein the flip portion is provided in a drawer capable of being drawn forward to a case body together with the roll paper housing.

3. A printer comprising:

a case including a case body;

a roll paper housing that houses roll paper;

a sheet paper housing that houses sheet paper;

a print portion that prints on the roll paper and the sheet paper; and a flip portion that flips a side of the sheet paper to be printed on by the print portion, and a drawer provided in the case body, and capable of being drawn forward to the case body, wherein the flip portion is provided, integrally with the roll paper housing, in the drawer.

4. The printer according to claim 1, wherein a portion of the flip portion is exposed outside with a front of the roll paper housing open.

5. The printer according to claim 1, comprising a cutter that cuts at least a portion of the sheet paper; and a waste box that is removably attached in front of the roll paper housing, and houses pieces of paper cut and separated by the cutter, wherein a portion of the flip portion is exposed outside with the waste box removed.

6. The printer according to claim 1, wherein a radius of curvature of a curved portion that is a portion of the flip portion is 20 mm or more.

7. The printer according to claim 1, wherein the upward convex curved portion is arranged to be overlapped with the roll paper housing in a height direction of the printer.

8. The printer according to claim 1, wherein the sheet paper housing is configured to be pulled out of the printer from a front side thereof and the upward convex curved portion of the flip portion is positioned closer to the front side of the printer than the roll paper housing.

9. The printer according to claim 1, wherein the portion through which the sheet paper passes after printing overlaps with the roller paper housing in a front and back direction of the printer.

10. The printer according to claim 3, wherein at least a part of the flip portion is capable of being drawn forward for accessing a carrying path of the sheet of paper from a front side of the printer.

* * * * *